United States Patent
Stewart et al.

(10) Patent No.: US 10,569,484 B2
(45) Date of Patent: Feb. 25, 2020

(54) DEVICE FOR TRANSPORTING, PLACING AND COMPACTING COMPOSITE STIFFENERS

(71) Applicant: The Boeing Company, Chicago, IL (US)

(72) Inventors: Samuel Ray Stewart, Redmond, WA (US); Paul James Ballow, Summerville, SC (US)

(73) Assignee: The Boeing Company, Chicago, IL (US)

( * ) Notice: Subject to any disclaimer, the term of this patent is extended or adjusted under 35 U.S.C. 154(b) by 1214 days.

(21) Appl. No.: 14/669,506

(22) Filed: Mar. 26, 2015

(65) Prior Publication Data

US 2015/0197065 A1  Jul. 16, 2015

Related U.S. Application Data

(62) Division of application No. 13/205,226, filed on Aug. 8, 2011, now Pat. No. 8,997,642.

(51) Int. Cl.
  B30B 11/00 (2006.01)
  B29C 70/30 (2006.01)
  (Continued)

(52) U.S. Cl.
  CPC .............. B29C 70/54 (2013.01); B29C 70/30 (2013.01); B29C 70/38 (2013.01); B29D 99/0003 (2013.01); B30B 11/001 (2013.01); B30B 15/024 (2013.01); *B29L 2009/00* (2013.01); *B29L 2031/3076* (2013.01);
  (Continued)

(58) Field of Classification Search
  CPC ..... B29C 33/485; B29C 33/50; B29C 33/505; B29C 31/008; B29C 53/04; B29C 2043/3605; B29C 70/38; B29C 70/30; B29C 70/54; B64C 1/064; B30B 11/001; B30B 15/024; B29D 99/0003; Y10T 29/49826; Y10T 156/10; Y10T 156/1082;
  (Continued)

(56) References Cited

U.S. PATENT DOCUMENTS 2,666,951 A     1/1954  Grove et al.
2,810,976 A  *  10/1957 Scott ..................... B41F 17/001
                                               100/211
(Continued)

FOREIGN PATENT DOCUMENTS

CN     102015261 A    4/2011
CN     102431182 A    5/2012
(Continued)

OTHER PUBLICATIONS

Notice of Reasons for Rejection and English Translation, dated Jul. 12, 2016, regarding Japanese Patent Application No. 2014-525020, 9 pages.

(Continued)

*Primary Examiner* — Jimmy T Nguyen
(74) *Attorney, Agent, or Firm* — Yee & Associates, P.C.

(57) ABSTRACT

A device for compacting a contoured elongate composite layup includes flexible first and second fiber reinforced resin flexible sections flexible along their lengths. The first section is flexible within a first plane and the second section is flexible within the first plane as well as within a second plane.

20 Claims, 15 Drawing Sheets

(51) Int. Cl.
- *B29C 70/54* (2006.01)
- *B30B 15/02* (2006.01)
- *B29D 99/00* (2010.01)
- *B29C 70/38* (2006.01)
- B29L 9/00 (2006.01)
- B29L 31/30 (2006.01)

(52) U.S. Cl.
CPC .......... *Y02T 50/43* (2013.01); *Y10T 29/49826* (2015.01); *Y10T 156/10* (2015.01); *Y10T 156/1082* (2015.01)

(58) Field of Classification Search
CPC ......... B29L 2009/00; B29L 2031/3076; Y02T 50/43
USPC ........................................................ 100/211
See application file for complete search history.

(56) References Cited

U.S. PATENT DOCUMENTS

| | | | |
|---|---|---|---|
| 2,816,593 | A | 12/1957 | Hein |
| 2,986,194 | A | 5/1961 | De Marco |
| 2,995,177 | A | 8/1961 | Tolonen |
| 3,185,605 | A | 5/1965 | Alan et al. |
| 3,285,794 | A | 11/1966 | Brownlee et al. |
| 3,357,379 | A * | 12/1967 | Wiley, Jr. .................. F23G 5/10 100/211 |
| 4,086,378 | A | 4/1978 | Kam et al. |
| 4,185,069 | A | 1/1980 | Smith et al. |
| 4,187,776 | A | 2/1980 | Schroder |
| 4,550,044 | A | 10/1985 | Rosenberg et al. |
| 4,712,472 | A | 12/1987 | Meisen et al. |
| 4,790,898 | A | 12/1988 | Woods |
| 4,861,406 | A | 8/1989 | Baker et al. |
| 4,875,962 | A | 12/1989 | Breakspear |
| 4,980,008 | A * | 12/1990 | Woods ...................... B44C 1/16 100/211 |
| 5,214,951 | A | 6/1993 | Waddell |
| 5,425,973 | A | 6/1995 | Frangipane et al. |
| 5,538,589 | A * | 7/1996 | Jensen .................. B29C 69/004 100/211 |
| 5,676,080 | A | 10/1997 | Allen |
| 5,700,347 | A | 12/1997 | McCowin |
| 6,045,651 | A | 4/2000 | Kline et al. |
| 6,649,006 | B2 | 11/2003 | Benson et al. |
| 6,814,916 | B2 | 11/2004 | Willden et al. |
| 7,052,572 | B2 * | 5/2006 | Miura ...................... B29C 43/10 156/286 |
| 7,097,731 | B2 | 8/2006 | Puriefoy et al. |
| 7,137,182 | B2 | 11/2006 | Nelson |
| 7,513,769 | B2 | 4/2009 | Benson et al. |
| 7,644,491 | B2 | 1/2010 | Absalonson |
| 7,788,784 | B2 | 9/2010 | Absalonson et al. |
| 7,814,644 | B2 | 10/2010 | Harrison et al. |
| 8,663,626 | B2 | 3/2014 | Duqueine et al. |
| 8,997,642 | B2 * | 4/2015 | Stewart .................. B29C 70/38 100/35 |
| 9,649,809 | B2 | 5/2017 | Lee et al. |
| 9,731,457 | B2 | 8/2017 | Kline |
| 9,931,807 | B2 * | 4/2018 | Stewart ...................... B32B 1/04 |
| 10,131,100 | B2 | 11/2018 | Kline |
| 2002/0056788 | A1 | 5/2002 | Anderson |
| 2003/0068472 | A1 | 4/2003 | Benson et al. |
| 2006/0231981 | A1 | 10/2006 | Lee et al. |
| 2006/0249626 | A1 | 11/2006 | Simpson et al. |
| 2008/0111024 | A1 | 5/2008 | Lee et al. |
| 2008/0290214 | A1 | 11/2008 | Guzman et al. |
| 2009/0000726 | A1 | 1/2009 | McCowin et al. |
| 2009/0008825 | A1 | 1/2009 | Eberth et al. |
| 2009/0294040 | A1 * | 12/2009 | Fernandez ............ B29C 33/505 156/245 |
| 2010/0009124 | A1 * | 1/2010 | Robins .................... B29C 70/54 428/156 |
| 2010/0215887 | A1 | 8/2010 | Kawabe |
| 2012/0076989 | A1 | 3/2012 | Bland |
| 2012/0121866 | A1 | 5/2012 | Hawkins et al. |
| 2013/0036922 | A1 | 2/2013 | Stewart et al. |
| 2013/0333830 | A1 | 12/2013 | Stewart |
| 2014/0127473 | A1 | 5/2014 | Kline |
| 2014/0314996 | A1 | 10/2014 | Stewart |
| 2015/0044430 | A1 | 2/2015 | Lee et al. |
| 2016/0176495 | A1 | 6/2016 | Stewart |
| 2017/0312999 | A1 | 11/2017 | Kline |
| 2018/0169991 | A1 | 6/2018 | Stewart |

FOREIGN PATENT DOCUMENTS

| | | |
|---|---|---|
| JP | 2008535709 A | 9/2008 |
| JP | 2008307692 A | 12/2008 |
| JP | 2009508711 A | 3/2009 |
| JP | 2011093253 A | 5/2011 |
| WO | WO2007001447 A2 | 1/2007 |
| WO | WO2007039085 A1 | 4/2007 |
| WO | WO2008003721 A1 | 1/2008 |
| WO | WO2008003733 A1 | 1/2008 |
| WO | WO2008003767 A1 | 1/2008 |
| WO | WO2011032865 A1 | 3/2011 |
| WO | WO2013022534 A2 | 2/2013 |

OTHER PUBLICATIONS

State Intellectual Property Office of PRC Notification of First Office Action and English Translation, dated Jun. 26, 2015, regarding Application No. 201280038782.7, 16 pages.
Office Action, dated Jul. 23, 2015, regarding U.S. Appl. No. 13/904,224, 12 pages.
Japanese Decision of Rejection and English translation, dated Feb. 13, 2018, regarding Application No. 2016-223549, 6 pages.
Japanese Notice of Reasons for Rejection and English translation, dated Mar. 13, 2018, regarding Application No. 2016-508947, 9 pages.
Canadian Intellectual Property Office Examination Search Report, dated May 30, 2016, regarding Application No. 2,898,331, 3 pages.
European Patent Office Examination Report, dated Oct. 31, 2017, regarding Application No. 14721157.7, 4 pages.
State Intellectual Property Office of PRC, Notification of the Decision of Rejection, dated Nov. 30, 2017, regarding Application No. 201480022123.3, 14 pages.
State Intellectual Property Office of PRC, Notification of Second Office Action and English Translation, dated Aug. 28, 2017, regarding Application No. 201480022123.3, 17 pages.
Japanese Notice of Reasons for Rejection and English translation, dated Oct. 24, 2017, regarding Application No. 2016-223549, 7 pages.
Notice of Allowance, dated Oct. 19, 2017, regarding U.S. Appl. No. 13/968,957, 11 pages.
Notice of Allowance, dated Oct. 23, 2015, regarding U.S. Appl. No. 13/904,224, 12 pages.
Office Action, dated Mar. 3, 2015, regarding U.S. Appl. No. 13/904,224, 23 pages.
Canadian Intellectual Property Office Examination Search Report, dated Mar. 12, 2015, regarding Application No. 2,835,892, 4 pages.
International Search Report and Written Opinion, dated Feb. 7, 2013, regarding Application No. PCT/US2012/045674, 10 pages.
International Search Report and Written Opinion, dated Aug. 7, 2014, regarding Application No. PCT/US2014/031621, 10 pages.
Office Action, dated May 8, 2014, regarding U.S. Appl. No. 13/205,226, 13 pages.
Final Office Action, dated Nov. 5, 2014, regarding U.S. Appl. No. 13/205,226, 7 pages.
Notice of Allowance, dated Dec. 1, 2014, regarding U.S. Appl. No. 13/205,226, 10 pages.
State Intellectual Property Office of PRC Notification of First Office Action and English Translation, dated Nov. 30, 2016, regarding Application No. 201480022123.3, 19 pages.
Office Action, dated Apr. 19, 2017, regarding U.S. Appl. No. 13/968,957, 45 pages.

(56) References Cited

OTHER PUBLICATIONS

European Patent Office Examination Report, dated May 11, 2017, regarding Application No. 14721157.7, 4 pages.
Korean International Property Office Notice of Office Action and English Translation, dated Jun. 20, 2018, regarding Application No. 10-2013-7032382, 7 pages.
Notice of Allowance, dated Sep. 25, 2018, regarding U.S. Appl. No. 15/890,195, 21 pages.
Office Action, dated Jun. 27, 2018, regarding U.S. Appl. No. 15/057,075, 53 pages.
Korean International Property Office Notice of Office Action and English Translation, dated Feb. 26, 2019, regarding Application No. 10-2018-7035679, 6 pages.
Notice of Allowance, dated Jan. 25, 2019, regarding U.S. Appl. No. 15/057,075, 24 pages.
Brazilian Ministry of Economics, Preliminary Office Action and English translation, dated Jul. 3, 2019, regarding Application No. BR112014002045, 5 pages.

\* cited by examiner

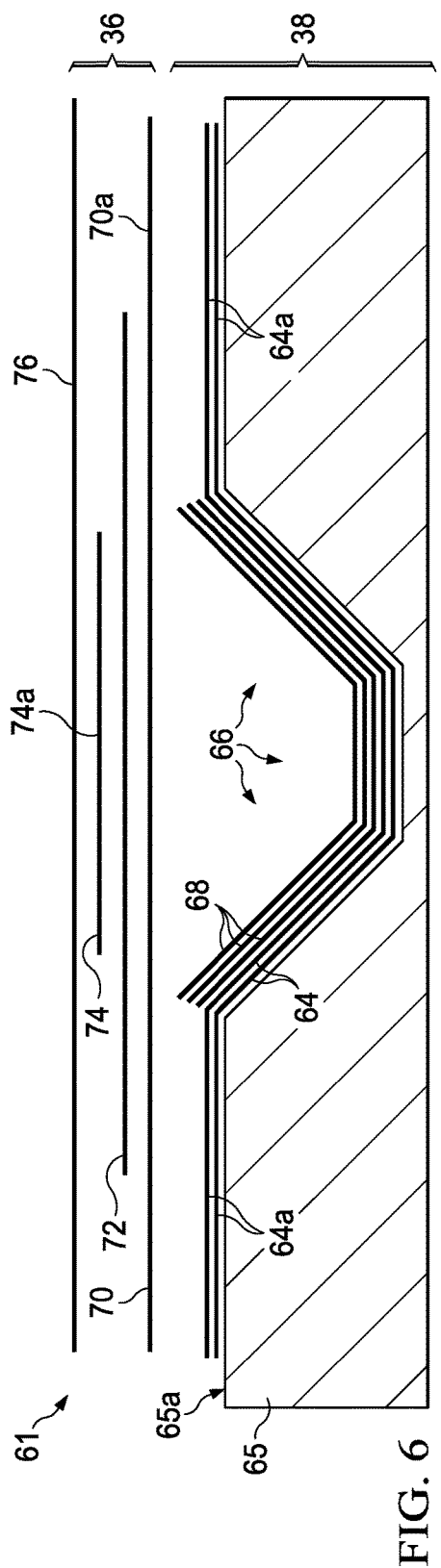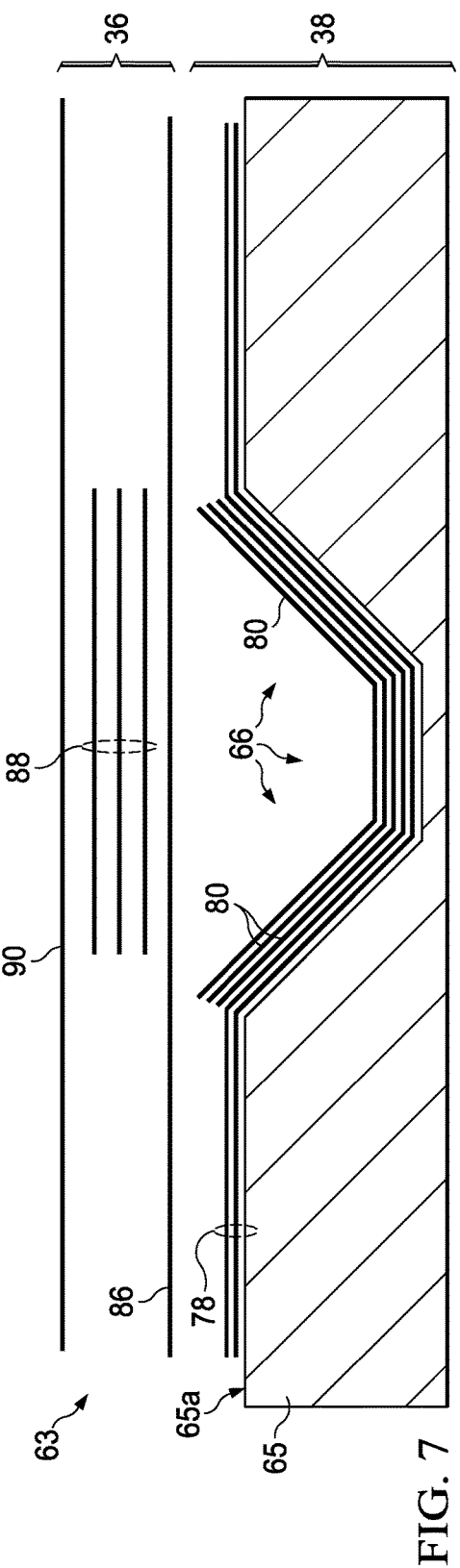

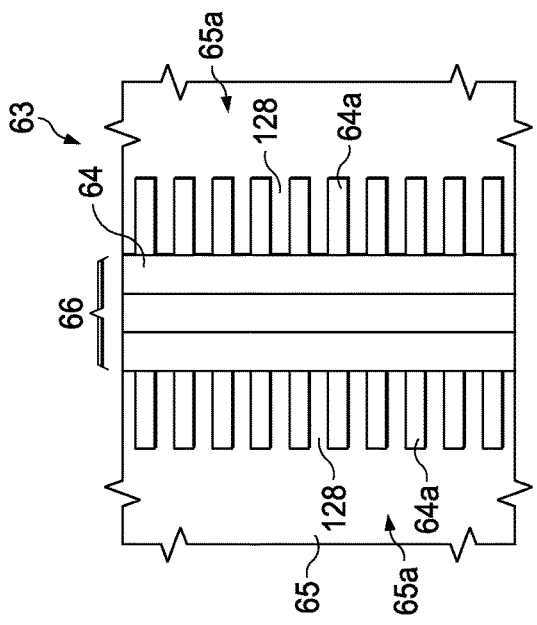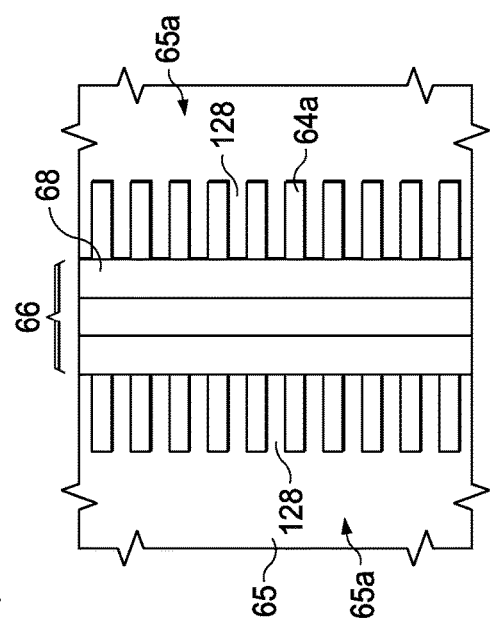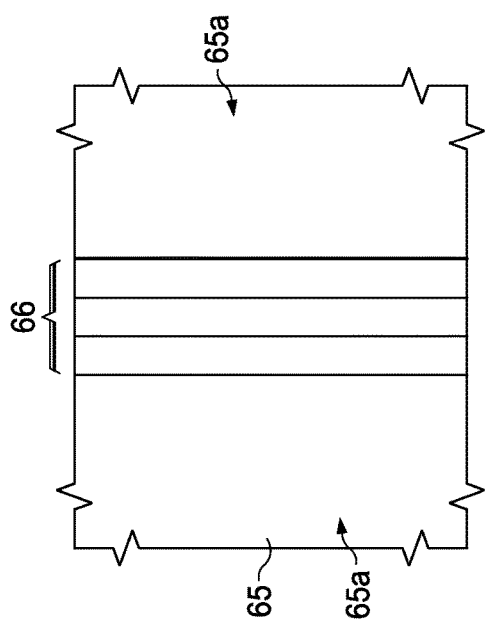

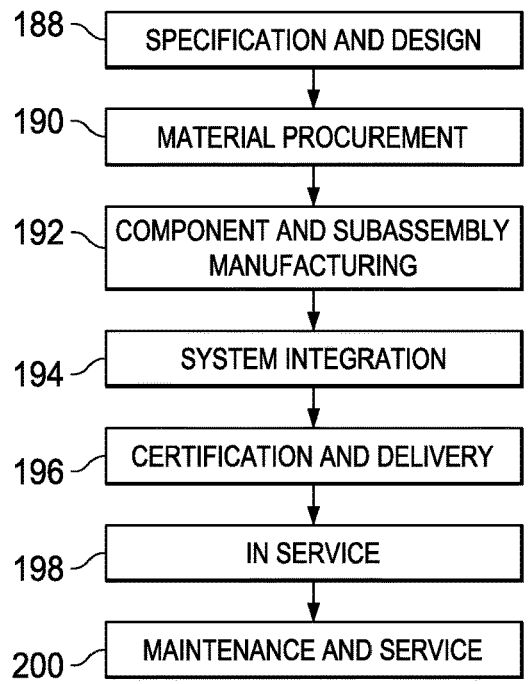
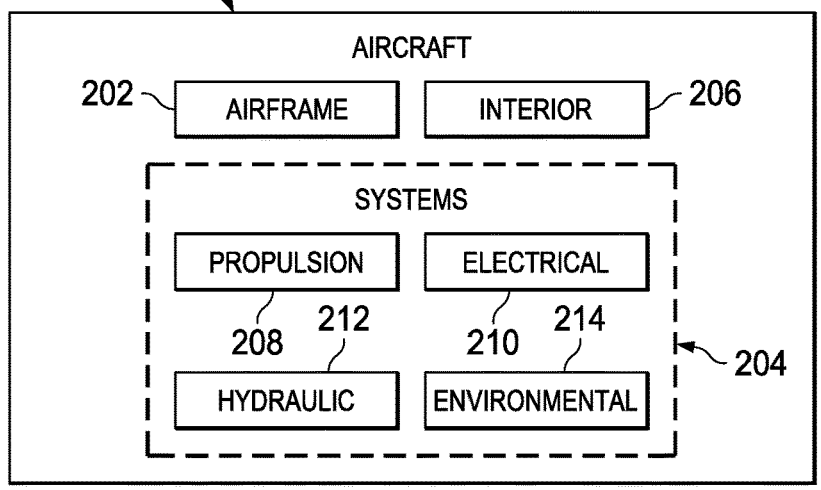

DEVICE FOR TRANSPORTING, PLACING AND COMPACTING COMPOSITE STIFFENERS

CROSS-REFERENCE TO RELATED APPLICATION(S)

This application is a division of and claims the benefit of priority to U.S. patent application Ser. No. 13/205,226, filed Aug. 8, 2011 and entitled "Method for Transporting, Placing and Compacting Composite Stiffeners", the contents of which are incorporated herein by reference.

BACKGROUND INFORMATION

1. Field

The present disclosure generally relates to the fabrication composite structures, and deals more particularly with a method and device for transporting, placing and compacting contoured composite stiffeners.

2. Background

During the fabrication of contoured composite stiffeners such as stringers, a compactor may be used to compact a layup of the stringer against tool surfaces. In some cases, the tool surfaces may be contoured along one or more planes. Compactors have been developed that are flexible along a single plane of curvature, consequently where the stringer is contoured in more than one plane, the tool surfaces have relatively complex geometries that require the compaction process to be performed by hand. When laying up compound contoured composite stringers by hand, wrinkles may form in the laminate plies which gather at various points in the layup and/or undesired fiber distortion may occur. Using hand layup techniques, the location of ply wrinkles and ply gathering is difficult to control, thus introducing variations in the finished part that may affect part performance. Also, the human factor involved in hand layup may introduce process variations that lead to undesired inconsistencies in the finished parts.

Accordingly, there is a need for a method and device for compacting contoured composite stiffeners such as stringers which may consistently and predictably distribute ply wrinkles and gathering in a manner that improves part quality and/or performance. There is also a need for a compactor device that may be used to transport stringers to a cure tool and which conforms to compound curvatures of the stringer during stringer placement and compaction.

SUMMARY

The disclosed embodiments provide a method and device for transporting, placing and compacting composite stiffeners, such as stringers, that are contoured in more than one plane. The compactor places and compacts stringer layups in a cure tool in a manner that regulates and standardizes the distribution of ply wrinkling and/or ply gathering. The disclosed compaction device is flexible in multiple planes and conforms to contours of the stringer regardless of undulations in stringer geometry. Predictable ply wrinkling/gathering allows engineering changes to be made in the stringer design which compensate for the ply wrinkling and/gathering, thereby improving part quality and/or performance.

According to one disclosed embodiment, a compactor is provided for use in fabricating a contoured elongate composite structure. The compactor comprises at least a first section flexible along its length within a first plane, and at least a second section coupled with the first section and flexible along its length within the first plane and within a second plane. The first and second planes are generally orthogonal to each other. Each of the first and second sections includes a generally planar cap portion and a hat portion adapted to be received within a cavity in the composite structure. The cap portion includes a plurality of reinforcement strips extending transversely across the width of the cap portion and spaced along its length. The cap portion also includes a plurality of flexible rubber joints along its length which allow the second section to flex within the second plane. The hat portion includes a plurality of transversely extending slits therein which are substantially aligned with the flexible rubber joints.

According to another embodiment, a device is provided for transporting and compacting a contoured composite hat stiffener layup having a cavity therein. The device comprises a hat portion adapted to be placed within the cavity, and a generally planar cap portion coupled with the hat portion and flexible within a first plane generally parallel to the cap portion. The hat portion and the cap portion are each flexible in a second plane generally orthogonal to the first plane. The cap portion includes laminated plies of flexible material and strips of substantially rigid reinforcement. The flexible material may comprise a rubber.

According to a further embodiment, a method is provided of using a compactor to make a composite stiffener. The method comprises forming a composite stiffener layup and bringing the compactor into contact with the layup. The stiffener layup is adhered to the compactor, and the compactor is used to transport and place the stiffener layup on a surface. The stiffener layup is compacted against the surface by the compactor. Adhering the stiffener layup to the compactor includes generating a vacuum inside the compactor, and using the vacuum to suck the stiffener layup against the compactor. Sucking the stiffener layup against the compactor includes generating a suction force by drawing air through sides of the compactor in contact with the layup. Using the compactor to place the stiffener layup includes conforming the compactor to the geometry of the surface by allowing the compactor to flex within two generally orthogonal planes.

According to a still further embodiment, a method is provided of making a compactor flexible in orthogonal planes for compacting a contoured composite stiffener layup. The method comprises laying up at least a first portion of the compactor by placing a plurality of composite reinforcement strips in generally parallel, spaced apart relationship to each other, and forming flexible joints between the reinforcement strips by laminating a ply of flexible rubber with the reinforcement strips. The laminating includes cocuring the rubber ply and the reinforcement strips. Laying up the first portion of the compactor includes providing at least one flat ply of fiber reinforced resin, castellating opposite edges of the flat ply to form flange strips on the flat ply, and laying up the reinforcement strips over the flange strips.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is an illustration of an exploded, cross sectional view of a ply layup employed to form a section of the compactor shown in FIG. 1.

FIG. 7 is an illustration similar to FIG. 6 but showing a ply layup employed to form another section of a compactor shown in FIG. 1.

FIGS. 10-17 are illustrations of a plan views of a layup tool and successive ply layup steps used to fabricate the compactor.

FIG. 28 is an illustration of a flow diagram of aircraft production and service methodology.

FIG. 29 is an illustration of a block diagram of an aircraft.

DETAILED DESCRIPTION

Figure 1:
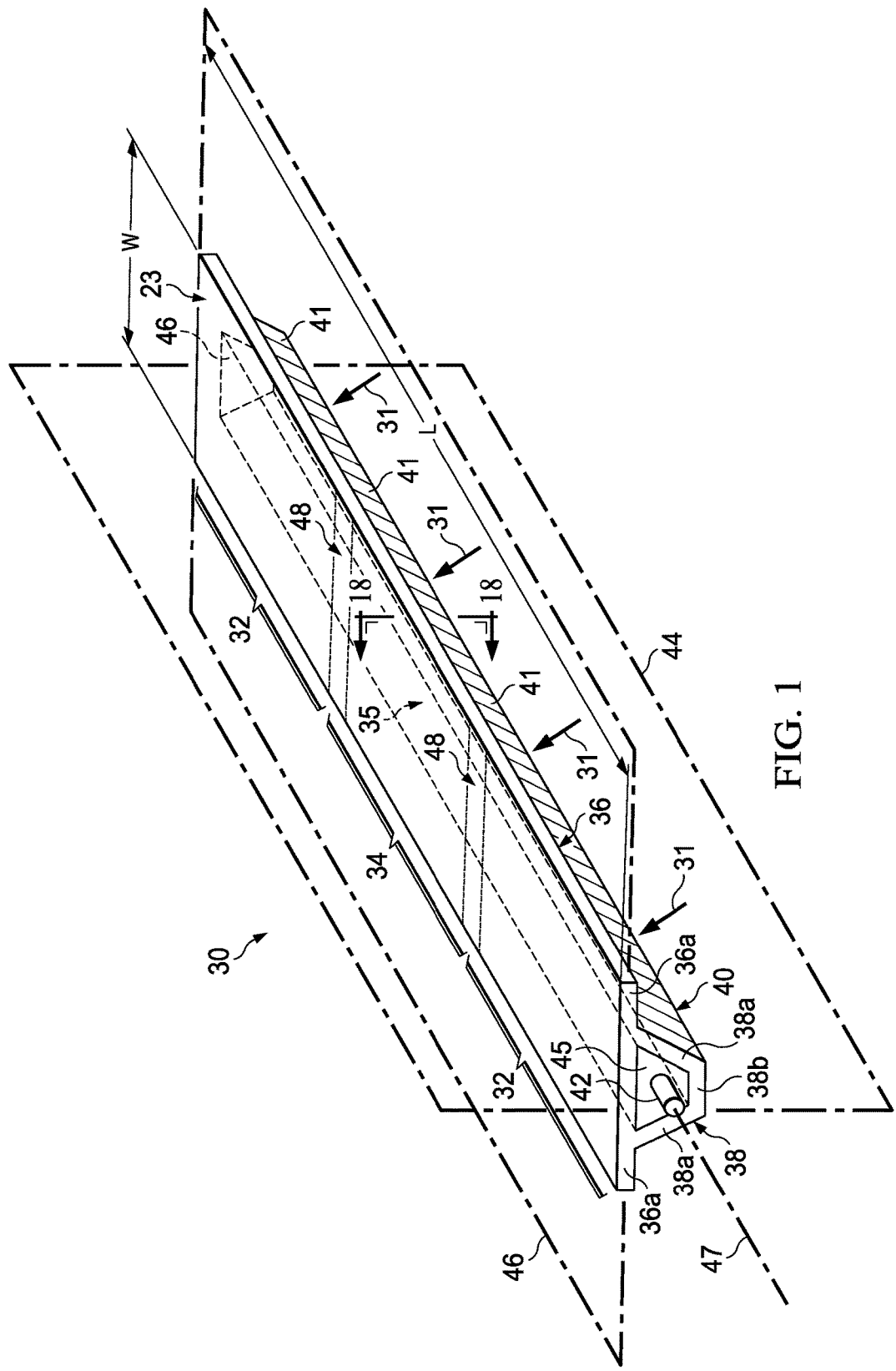
FIG. 1 is an illustration of a perspective view of a compactor according to one disclosed embodiment.

Referring first to FIGS. 1-5, a compactor 30 (FIG. 1) may be used to transport, place and compact a curved composite laminate stiffener, such as without limitation, the contoured hat stringer 50 shown in FIGS. 2-5. The compactor 30 is generally semi-rigid, with a degree of flexibility that allows the compactor 30 to flex and conform to complex tool surfaces (not shown in FIG. 1) during placement and compaction of a stringer layup in the tool. During transport and placement of the stringer 50, the stringer 50 is held on the compactor 30 by a vacuum suction force 31. The compactor 30 is elongate and broadly comprises a first, segmented hat portion 38, and a second, continuous, generally planar cap portion 36. The hat portion 38 includes inclined side walls 38a and a bottom wall 38b.

The cap 36 includes laterally extending flanges 36a. The cap portion 36, along with the hat portion 38 and a pair of end walls 45, form an enclosed interior space 35 extending substantially the entire length "L" of the compactor 30. A pneumatic fitting 42 in one or both of the end walls 45 is adapted to couple the interior space 35 of the compactor 30 with a suitable vacuum source (not shown) for drawing a vacuum within the compactor 30. As will be discussed below, the hat portion 38 includes a plurality of generally parallel slits 40 therein which allow air to be drawn through the hat portion 38 into the interior space 35. The slits 40 extend substantially the entire height of the hat portion 38 and divide it into individual segments 41 that allow the hat portion 38 of the compactor 30 to flex during placement and compaction of the layup in the tool. The slits 40 also allow air to be drawn into the interior space 35, creating a vacuum 31 suction force that holds the stringer 50 on the compactor 30 during transport, placement and compaction process. This vacuum adhesion of the stringer 50 to the compactor 30 may permit a more symmetrical distribution of ply wrinkling and gathering during stringer compaction.

The compactor 30 includes at least a first single flexible section 32 and at least a second double flexible section 34. The sections 32, 34 are coupled with each other by joints 48 that are suitable for the application, such as, without limitation, splice joints, scarf joints or butt joints. In the illustrated embodiment, the compactor 30 includes only one section 34 coupled between two of the sections 32 by two joints 48. However, the compactor 30 may have more than one of the sections 34 located at any area along the length of the compactor 30, including on either end of the compactor 30. In some embodiments, substantially the entire compactor 30 may comprise a double flexible section 34. The compactor 30 may have more or less than two of the single flexible sections 32. As will be discussed later in more detail, section 34 of the compactor 30 includes flexible joints 23 that allow section 34 to flex in each of two planes 44, 46 that are substantially orthogonal to each other. Plane 44 extends substantially parallel to and through the cap 36, while plane 46 extends substantially perpendicular to the cap 36. The flexible joint 23 may also allow torsional twisting of the compactor 30 along its longitudinal axis 47.

Both the cap portion 36 and the hat portion 38 may be formed from laminated plies (not shown in FIG. 1) of fiber reinforced resin, such as without limitation, carbon fiber epoxy. The number and thickness of the plies used to form the cap portion 36 in section 32 are chosen such the cap portion 36 is flexible within plane 44 to the degree necessary to allow the compactor 30 to conform with curved tool surfaces (not shown) during placement and compaction the stringer layup in the tool. The slits 41 in the hat portion 38 allow the hat portion 38 to flex along with the cap portion 38 within the plane 44.

Figure 24:
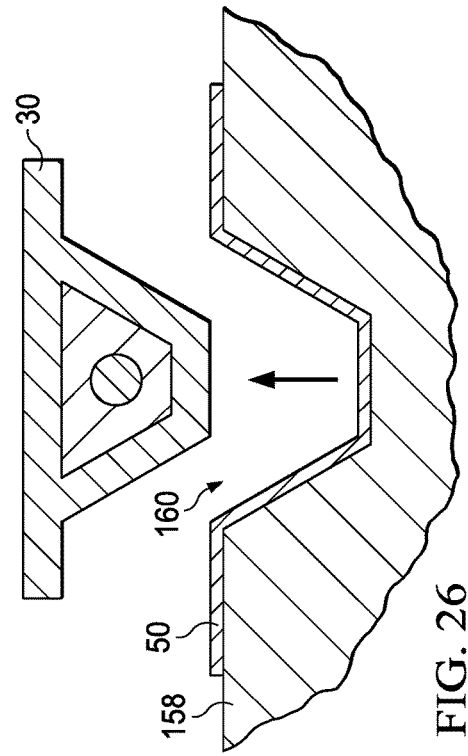

As will be described later, the area of the cap portion 36 that lies within the double flexible section 34 of the compactor 30 is formed from a combination of materials that are cocured to form a plurality of flexible joints 23. These flexile joints 23 allow the cap portion 36 to flex within both planes 44, 46, as well as to twist about its longitudinal axis 47. The slits 40 in the hat portion 38 also allow the area of the hat portion 38 within section 34 to flex within plane 46. As a result of the ability of the compactor 30 to flex within two planes 44, 46 and conform to the geometry of a contoured tool 158 (FIGS. 24-26) or other surface during the stringer placement and compaction process, the location and/or pattern of ply gathering and/or ply wrinkling (not shown) may become more consistent, regular and/or predictable from part-to-part, allowing suitable compensating engineering changes to be made to the design of the stringer 50 which may improve the performance of the stringer 50.

Figure 2:
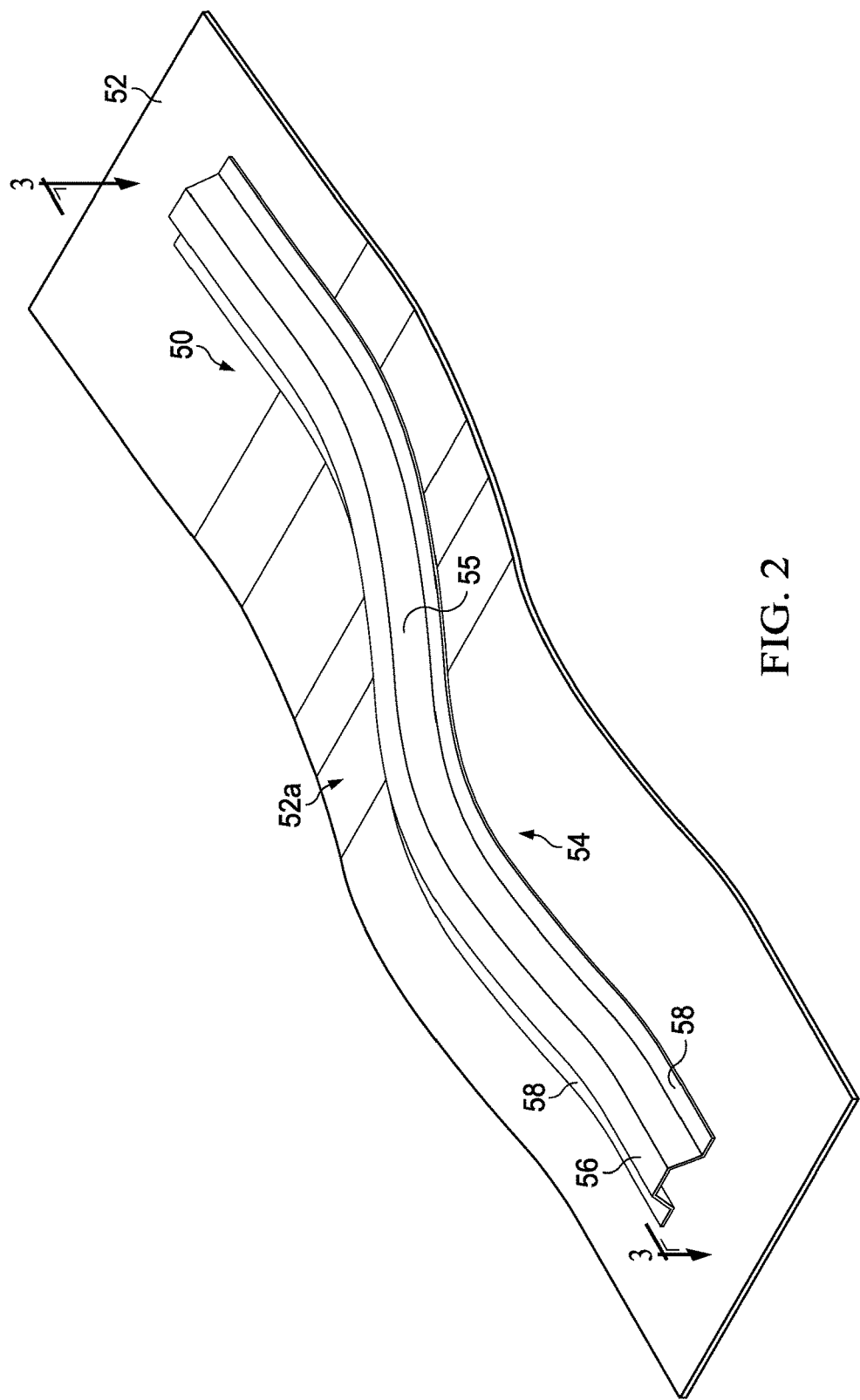
FIG. 2 is an illustration of a perspective view of a composite stringer attached to an aircraft skin curved in two planes.
Figure 3:
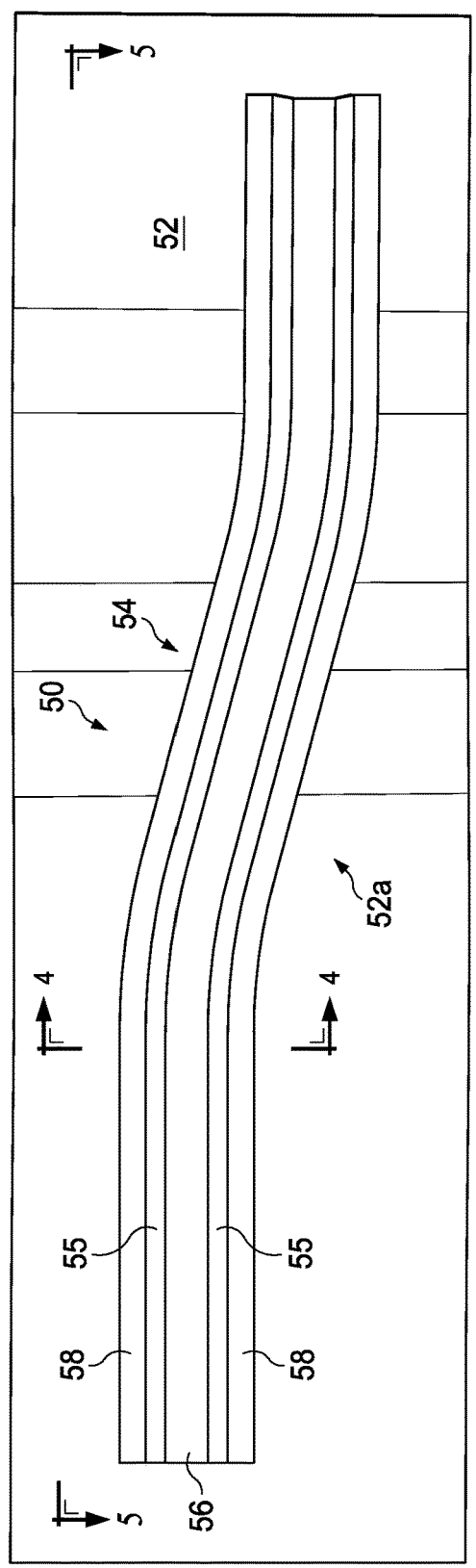
FIG. 3 is an illustration of a side view of the stringer shown in FIG. 2.
Figure 4:
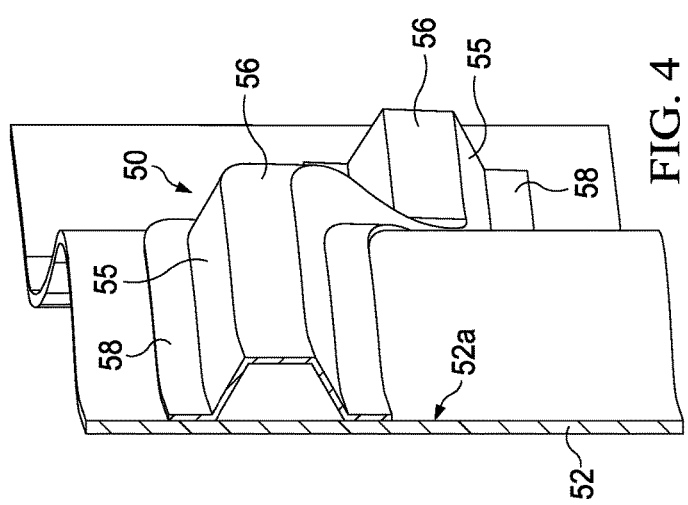
FIG. 4 is an illustration of a sectional view taken along the line 4-4 in FIG. 3.
Figure 5:
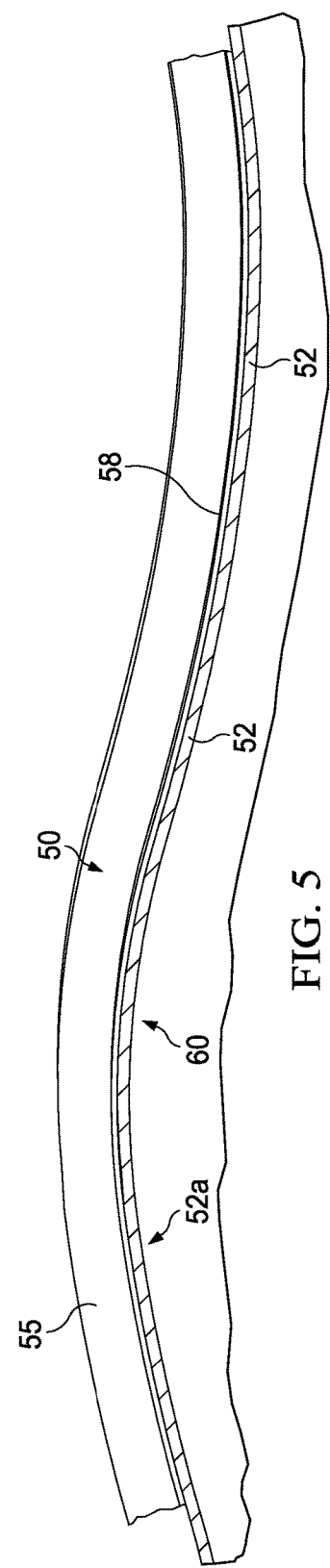
FIG. 5 is an illustration of a sectional view taken along the line 5-5 in FIG. 3.

Referring now to FIGS. 2-5, the hat stringer 50 has a generally hat shaped cross section comprising a top 56, inclined side walls 55, a pair of laterally extending flanges 58. The stringer 50 may be attached to the interior surface 52a of a skin 52 having compound contours to which the stringer 50 may be required to conform. The flanges 58 of the stringer 50 may be secured to the skin 52 by any suitable means, such as fasteners (not shown), bonding adhesives or by co-curing the composite stringer 50 with the skin 52 in those applications where the skin 52 is a composite. As shown in FIGS. 2 and 3, the stringer 50 has a first out-of-plane curvature 54, and as shown in FIG. 5 has a second out-of-plane curvature 60 conforming to the compound contours of the skin surface 52a.

Attention is now directed to FIG. 6 which illustrates a typical ply layup 61 used to form section 34 of the compactor 30 shown in FIG. 1. The layup 61 is formed ply-by-ply on a layup tool 65 having a cavity 66 for forming the hat portion 38 of the stringer 50, and flange surfaces 65a for forming the cap portion 36. Two full width plies 64 of fiber reinforced resin are laid over the cavity portion 66 and covering the flange surfaces 65a. Three additional plies 68 of fiber reinforced resin are laid up within the cavity portion 66. In one embodiment, plies 64 may be biased plies, while plies 68 may comprise a combination of biased plies and plain weave plies. The number of plies and their fiber orientations may vary, depending on the application.

A sixth ply 70 comprises a plurality of reinforcement strips 70a of unidirectional fiber reinforced resin which are spaced apart along the length of the tool 65 and each have fiber orientations extending transversely across the cavity portion 66. The sixth ply 70 may comprise one or more stacked reinforcement strips 70a of unidirectional prepreg tape. A seventh ply 72 comprises a layer of flexible uncured synthetic rubber, such as, without limitation, Viton® fluoroelastomer, which has a width slightly less than the strips in the sixth ply 70. The seventh ply 72 may comprise other materials that remain flexible following curing. An eighth ply 74 comprises a second set unidirectional fiber reinforced resin strips 74a which cover the cavity portion 66 of the tool 65 and are respectively aligned with the strips 70a forming ply 70, as will be discussed in more detail below. A final ninth ply 76 comprises a second full width layer of flexible uncured synthetic rubber, which may also be a fluoroelastomer such as Viton®. The hat portion 38 of the layup 61 is formed by plies 64 and 68, while the cap portion 36 is formed by a combination of plies, 64, 70, 72, 74 and 76.

Referring to FIG. 7, the layup 63 forming section 32 of the compactor 30 comprises a pair of full width plies 78 extending across the cavity portion 66 and over flange surfaces 65a of the tool 65. Three additional plies 80 are laid up over the cavity portion 66. Next, a full width ply 86 is laid up, followed by three plies 88 that cover only the cavity portion 66. Finally, another full width ply 90 is laid up. Each of the plies of the layup 63 may be comprise a unidirectional or woven fiber prepreg having fiber orientations selected for the particular application.

Figure 9:
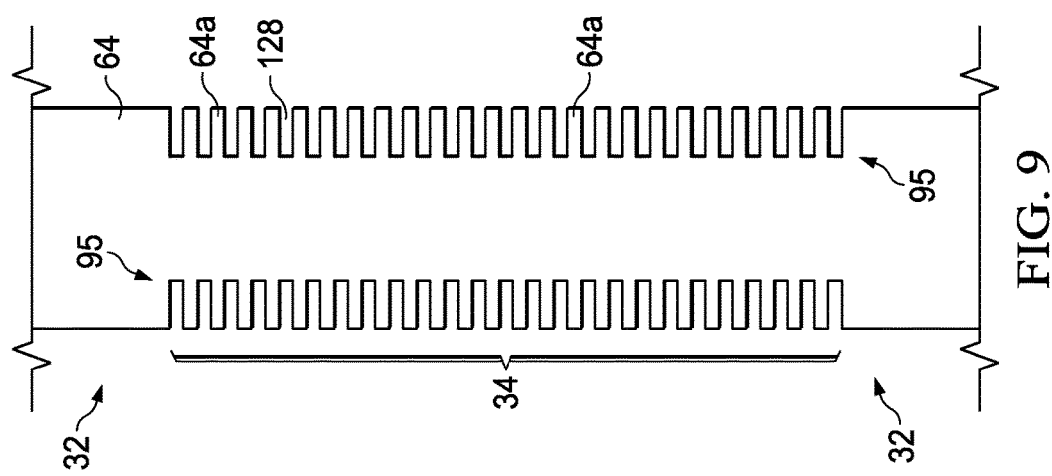
FIG. 9 is an illustration similar to FIG. 8, but showing opposing edges of a portion of the ply having been castellated.
Figure 8:
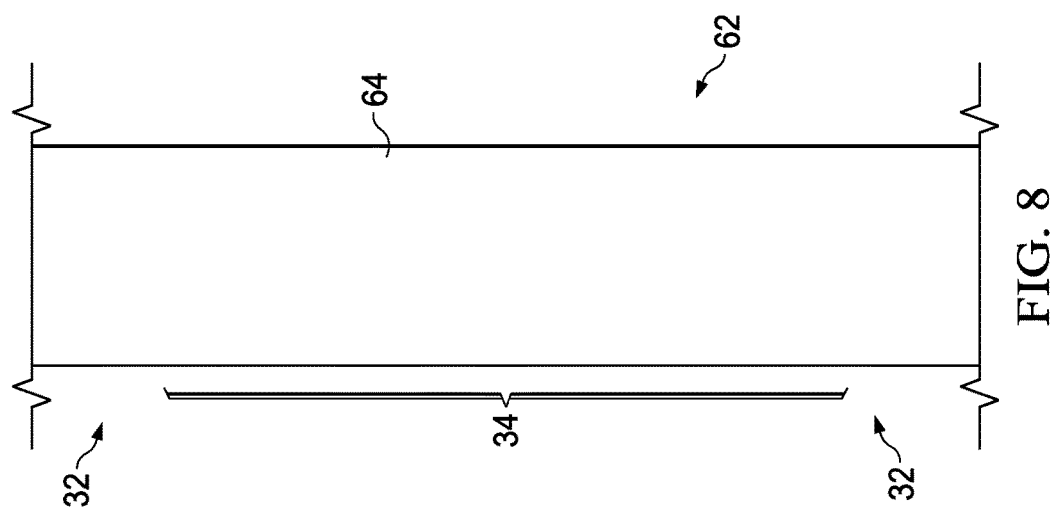
FIG. 8 is an illustration of a plan view of a ply forming part of the layups shown in FIGS. 6 and 7.

Attention is now directed to FIGS. 8-17 which illustrate the sequential steps used to form the layup 61 shown in FIG. 6. Referring first to FIG. 8, a substantially flat layup 62 of plies 64 shown in FIG. 6 is provided which has a length substantially equivalent to that of all three sections 32, 34 of the compactor 30. Next, as shown in FIG. 9, the opposing edges 95 along compactor section 34 of the layup 62 are castellated using any suitable material removal technique, such as, without limitation, die cutting. This castellation results in a series of reinforcement flange strips 64a in each of the plies 64 which are spaced apart along the length of section 34 and are separated by slots 128.

FIG. 10 illustrates the tool 65 ready to receive the ply layup 61 shown in FIG. 6. As previously mentioned, the tool 65 includes a hat shaped cavity portion 66 for forming the hat portion 38 of the compactor 30, and a pair of flange surfaces 65a for forming the flange portions 36a of the cap portion 36 of the compactor 30.

FIG. 11 illustrates the castellated plies 64 having laid up on the tool 65, with the spaced apart flange strips 64a overlying the flange surfaces 65a of the tool 65. FIG. 12 reflects completion of the next step in the layup process, in which the plies 68 are laid up within the cavity portion 66 of the tool 65, overlying plies 64. Then, as shown in FIG. 13, an inflatable bladder 142 is placed in the cavity portion 66, overlying plies 68.

Figure 14:
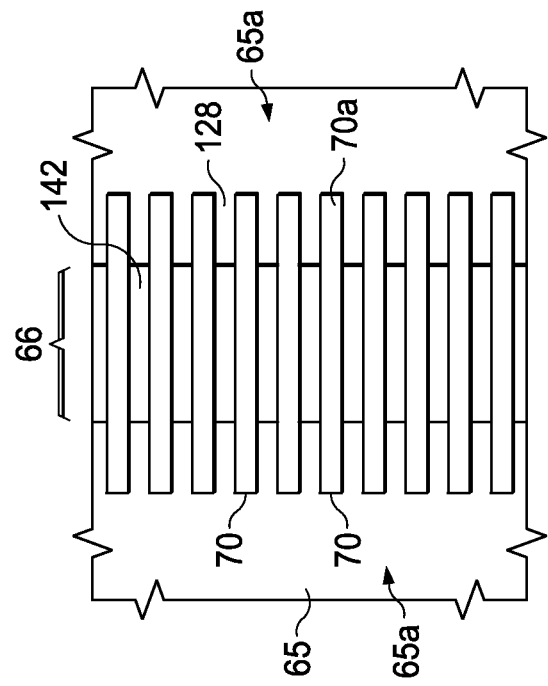

Referring to FIG. 14, the next step in the fabrication process comprises laying up the transversely extending unidirectional prepreg reinforcement strips 70a, in alignment with and overlying the flange strips 64a (FIG. 13) of the castellated layup 62. Each of the reinforcement strips 70a may comprise one or more plies of unidirectional prepreg tape, however other types of reinforcements may be possible. The reinforcement strips 70a span substantially the entire width of the cap section 36 and spaced on a pitch that is suited to the particular application.

Figure 13:
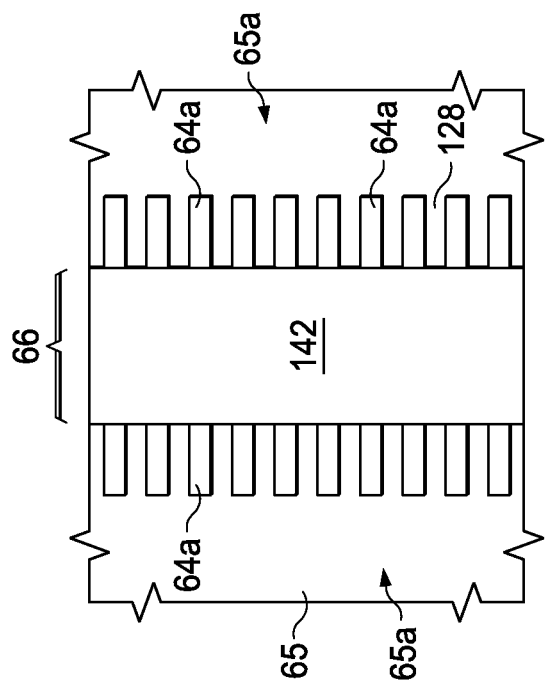
Figure 16:
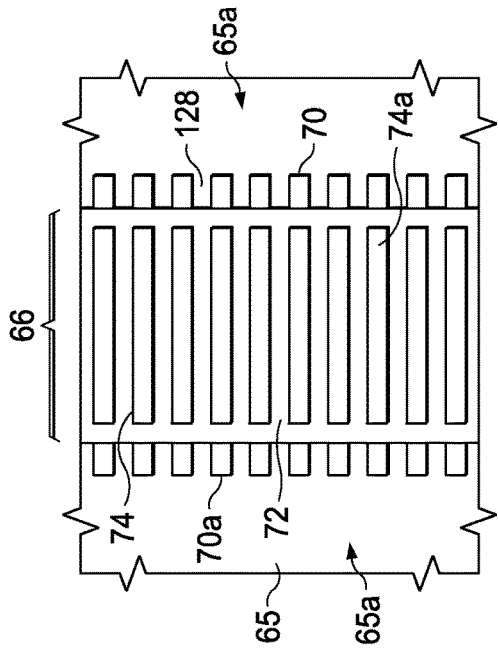
Figure 17:
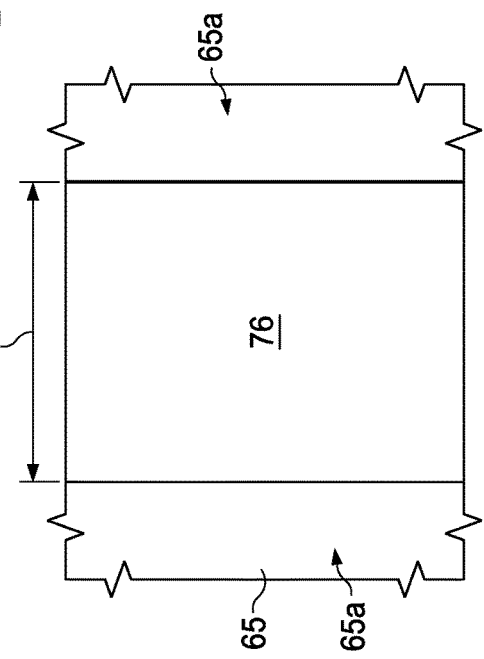
Figure 15:
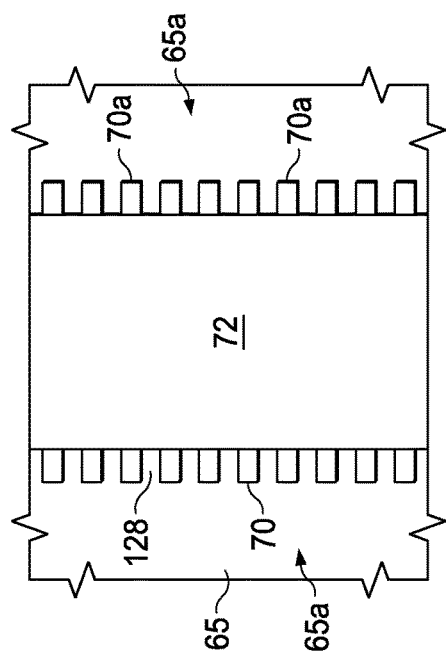

FIG. 15 shows rubber ply 72 having been laid up over the reinforcement strips 70a following which, as shown in FIG. 16, a second set of generally parallel, spaced apart reinforcement strips 74a are laid up over the rubber ply 72, aligned with both the underlying reinforcement strips 70a and the flange strips 64a (see FIGS. 13 and 14). The reinforcement strips 74a reinforce the area of the cap section 36 that overlies the cavity 66. Finally, as shown in FIG. 17, a second ply 76 of uncured synthetic rubber or similar flexible material is laid up over the reinforcement strips 74a. The second rubber ply 76 spans substantially the entire width of the layup 61.

Figure 18:
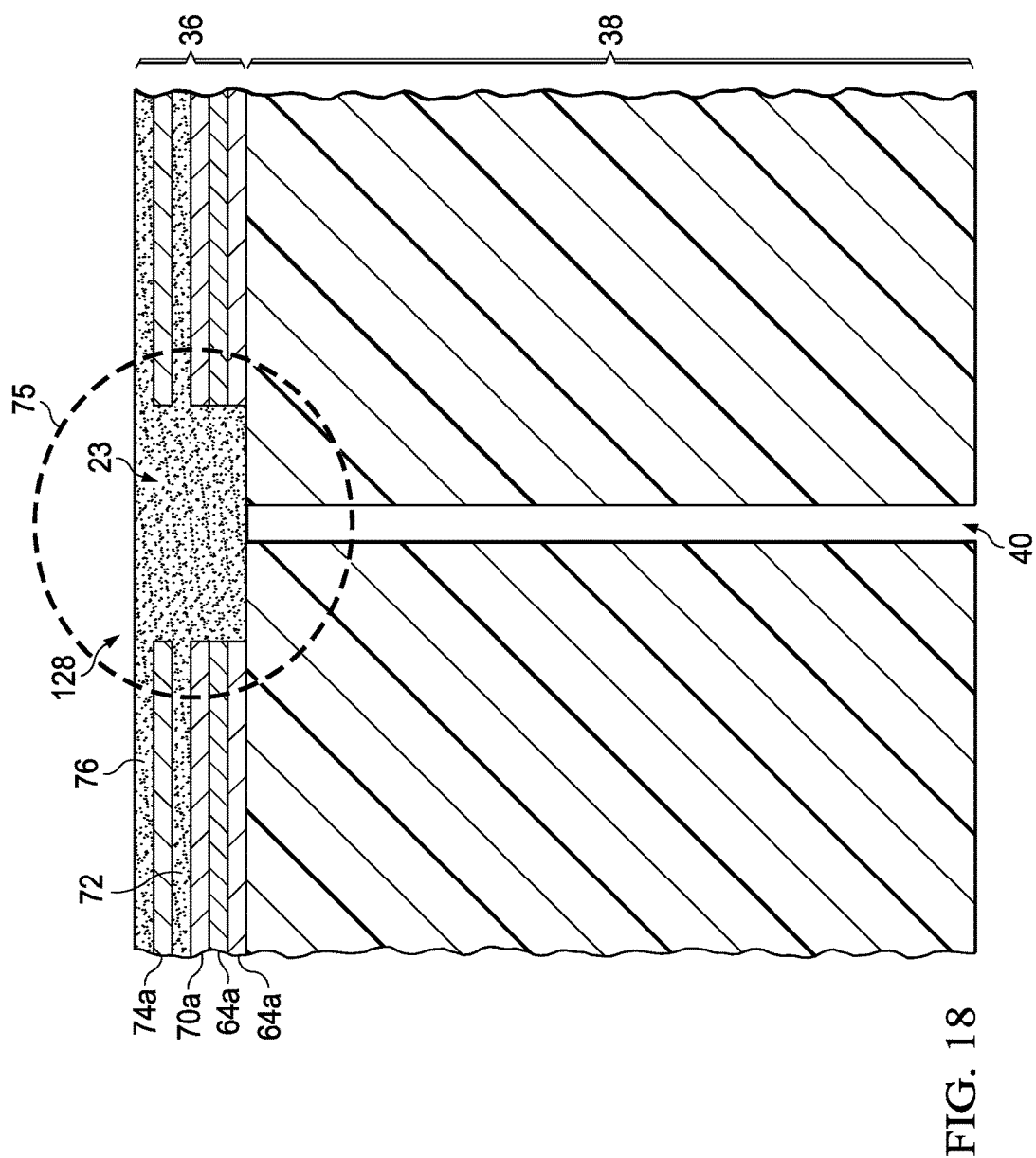
FIG. 18 is an illustration of a sectional view taken along the line 18-18 in FIG. 1.

FIG. 18 is a sectional illustration showing one of the flexible joints 23 in compactor section 34. The aligned stacking of the reinforcement strips 64a, 70a, 74a forms slots 128 that are filled with rubber from rubber plies 72, 76 during ply lamination of the cap portion 36. Following this lamination, the flexible rubber joints 23 extend across substantially the entire width of the cap portion 36. The reinforcement strips 64a, 70a, 74a provide the compactor section 34 with the rigidity needed to maintain its shape and prevent it from collapsing when a vacuum is drawn within the compactor 30, while the rubber filled slots 128 forming joints 23 allow the cap portion 36 to flex within either of orthogonal planes 44, 46 (FIG. 1). The flexible rubber joints 23 are aligned to coincide with the location of the slits 40 along the length of the compactor.

Figure 19:
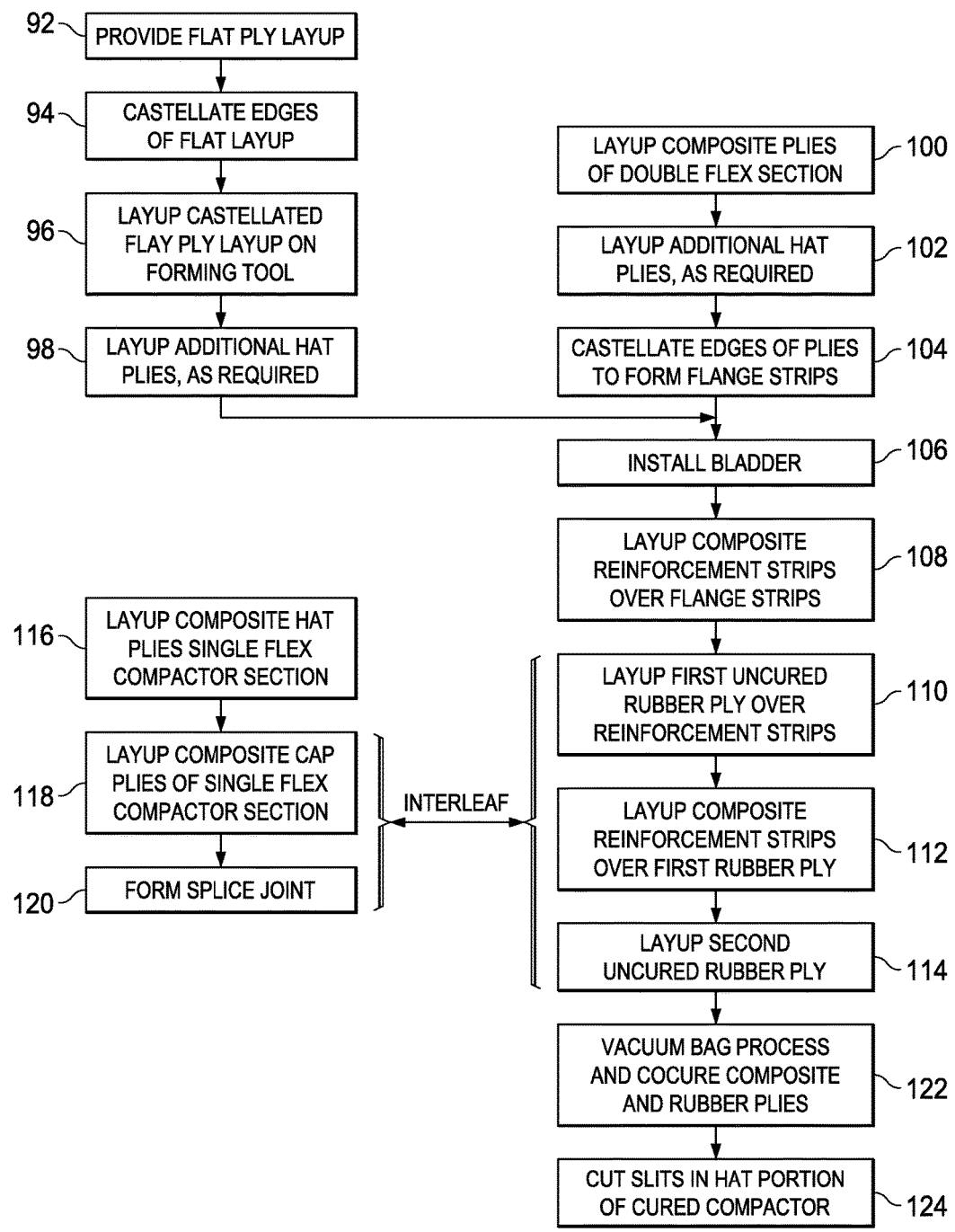
FIG. 19 is an illustration of a flow diagram of a method of fabricating the compactor.

FIG. 19 is a flow diagram illustrating the steps of a method of fabricating the compactor 30. In one embodiment, beginning at step 92, a flat layup 62 of plies 64 is provided, and at step 94 the edges of the layup 62 are castellated. At 96, the castellated layup 62 is placed on and formed over a tool 65, and additional plies 68 may be laid up, as required, to reinforce the hat portion 38 of the compactor 30. Then, as shown at 106, an inflatable bladder 142 is installed in a cavity of the tool 65, overlying plies 64, 68. Alternatively, as shown at 100, plies 64 may be laid up on the forming tool 65 without castellation, following which additional hat plies 68 may be laid up at 102, as required. At 104, the edges of plies 64 are castellated to form the reinforcement flange strips 64a in double flex section 34 of the compactor 30. At 108, the composite reinforcement strips 70a are laid up over the flange strips 64a, and at 110 the first ply 72 of uncured rubber is laid up over the flange strips 64a. At 112, the second set of unidirectional composite reinforcement strips 74a are laid up over the first rubber ply 72 in order to further reinforce the area of the cap portion 36 that overlies the cavity 66. At 114 the second ply 76 of uncured rubber is laid up over the reinforcement strips 74.

Each of the compactor sections 32 is laid up by first laying up the plies of the hat portion 38 in step 116, and then laying up the plies of the cap portion 36 at step 118. As the cap plies of compactor section 32 are being laid up, at least certain of these plies are interleafed with the cap plies of compactor section 34, as shown at step 120, in order to form the overlapping splice joints 48 between compactor sections 32, 34. The joints 48 may reduce localized stiffness and increase the overall durability of the compactor 30. As previously mentioned, although splice joints 48 have been shown in the exemplary embodiment, other types of joints may be possible.

At 122, the compactor layup is vacuum bagged and the rubber and composite resin plies are co-cured, either with or without autoclave processing. Following co-curing, the slits 40 in the hat portion 38 of the compactor 30 are formed by cutting, sawing, or other suitable processes. As previously mentioned, the slits 40 are located and spaced apart from each other such that they are substantially aligned with the rubber filed slots 128.

Figure 21:
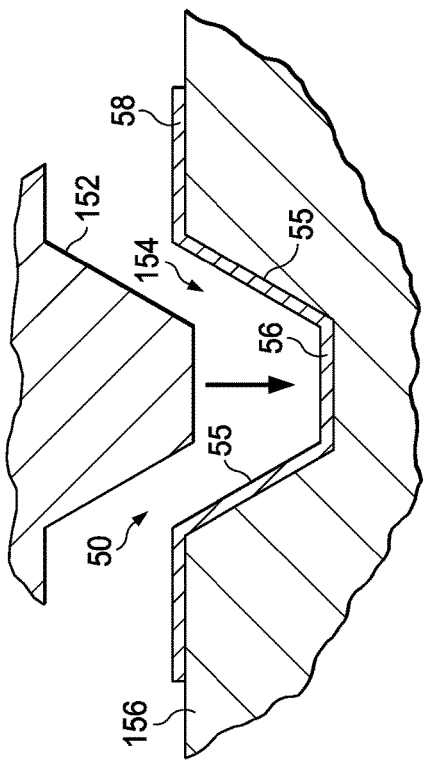
FIG. 21 is an illustration of a sectional view of the hat stringer formed between male and female stamping dies.
Figure 20:
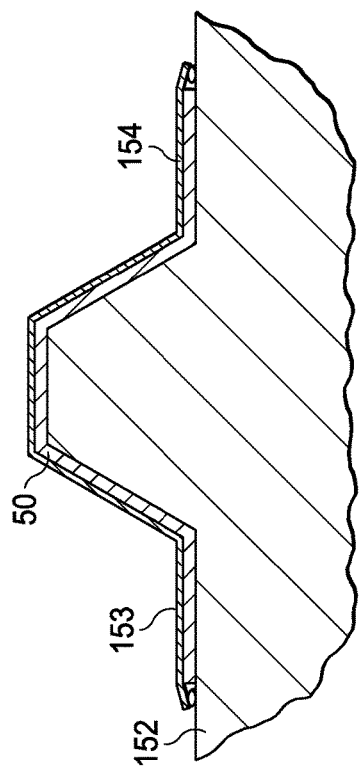
FIG. 20 is an illustration of a cross sectional view of a hat stringer being vacuum bag formed over a male die.
Figure 22:
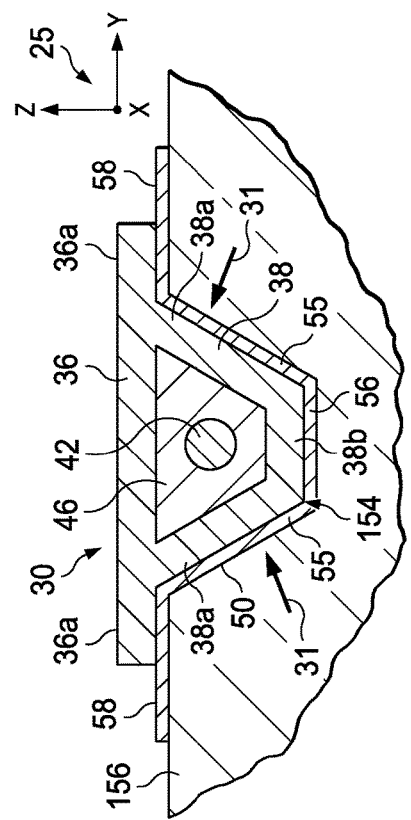
FIG. 22 is an illustration similar to FIG. 21 but showing the compactor having been installed in the stringer layup.

Attention is now directed to FIGS. 20-26 which illustrate the steps of a method of forming, transporting, placing and compacting a composite hat stringer 50 layup using the flexible compactor 30. Referring first to FIG. 20, a composite hat-shaped stringer 50 may be formed by placing a multi-ply composite charge over a male die 152 and using a vacuum bag 153 to compact and form the charge over the die 152. Alternatively, as shown in FIG. 21, the stringer 50 may be formed by stamp forming a composite charge between male and female dies 152, 156, respectively, creating a hat cavity 154. Following forming, the stringer 50 may be trimmed, as necessary. With the stringer 50 supported in the female die 156, the compactor 30 is placed in the hat cavity 154 of the stringer 50 such that the hat 38 portion of the compactor 30 engages sidewalls 55 and the top 56 of the stringer 50, and the flange portions 36a of the compactor cap 36 overlie and engage the flanges 58 of the stringer 50. The stringer 50 and the compactor 30 may remain in the female die 156 which may be used as a holding fixture to maintain the shape of the stringer 50 until the stringer 50 is ready to be removed and transported for placement. Optionally, the stringer 50 may be transferred to a holding fixture (not shown) until ready for placement. In order to remove stringer 50 from the female die 156 (or an optional holding fixture), a vacuum is drawn within the compactor 30 which draws air in through the slits 40 (FIG. 1) to create a suction force 31 (FIG. 22) that causes the stringer 50 to adhere to the compactor 30.

Figure 23:
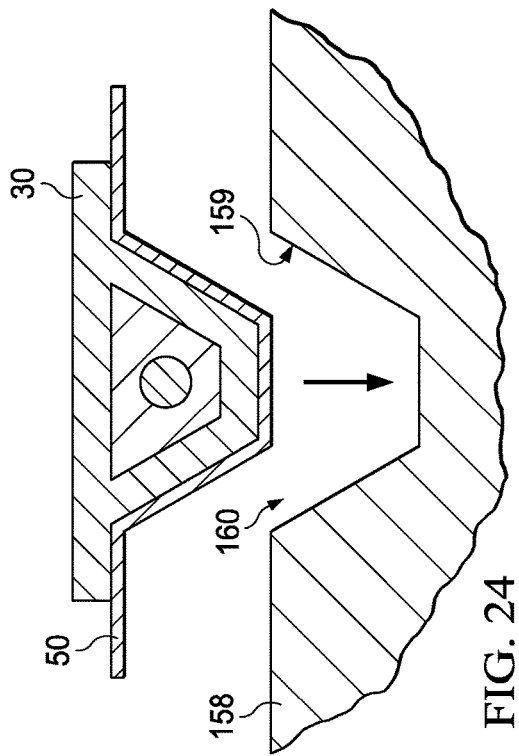
FIGS. 23-26 are illustrations of sectional views showing successive steps of transporting, placing and compacting the hat stringer in a cure tool using the compactor.
Figure 25:
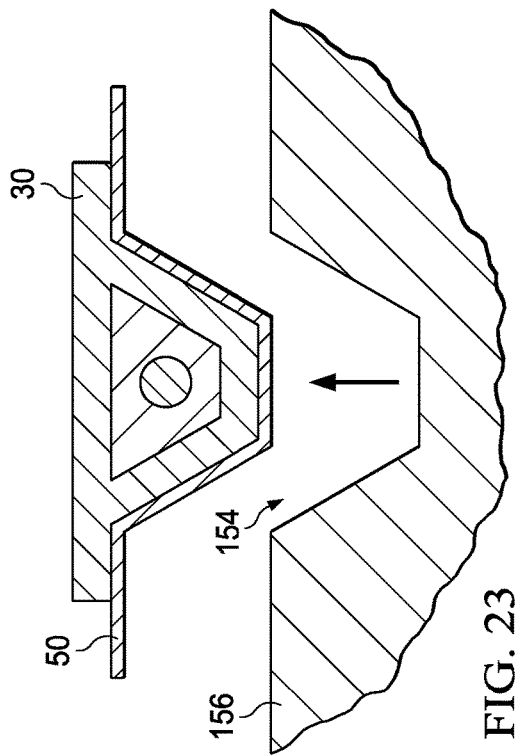
Figure 26:
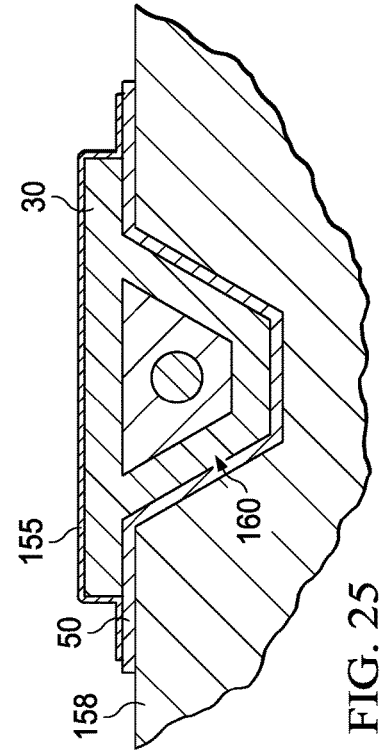

As shown in FIG. 23, with the stringer 50 adhered to the compactor 30, the compactor 30 is lifted along with the stringer 50 away from female die 156, and is used to transport the stringer 50 to a structure such as the tool 158, as shown in FIG. 23, having female tool surfaces 159 that are curved in more than one plane and substantially match the outer mold line (OML) surface (not shown) of the stringer 50. The compactor 30 is used to place the stringer 50 in a cavity 160 of the tool 158, as shown in FIG. 25. With the compactor 30 and the stringer 50 installed in the tool cavity 160, a vacuum bag assembly 155 is installed over the compactor 30 and the stringer 50, and a vacuum is drawn in the bag 155 (FIG. 25) which, along with the compactor 30, compacts the layup 50 against the tool surfaces 159. Following compaction of the stringer 50, as shown in FIG. 26, the compactor 30 is drawn away from the stringer 50. The stringer 50 may then be further processed. For example, fillers (not shown) may be installed in the stringer 50, one or more bladders (not shown) may be installed against the stringer 50, the stringer 50 may be attached to the skin 52 (FIG. 2) and cured in an autoclave (not shown), etc.

Figure 27:
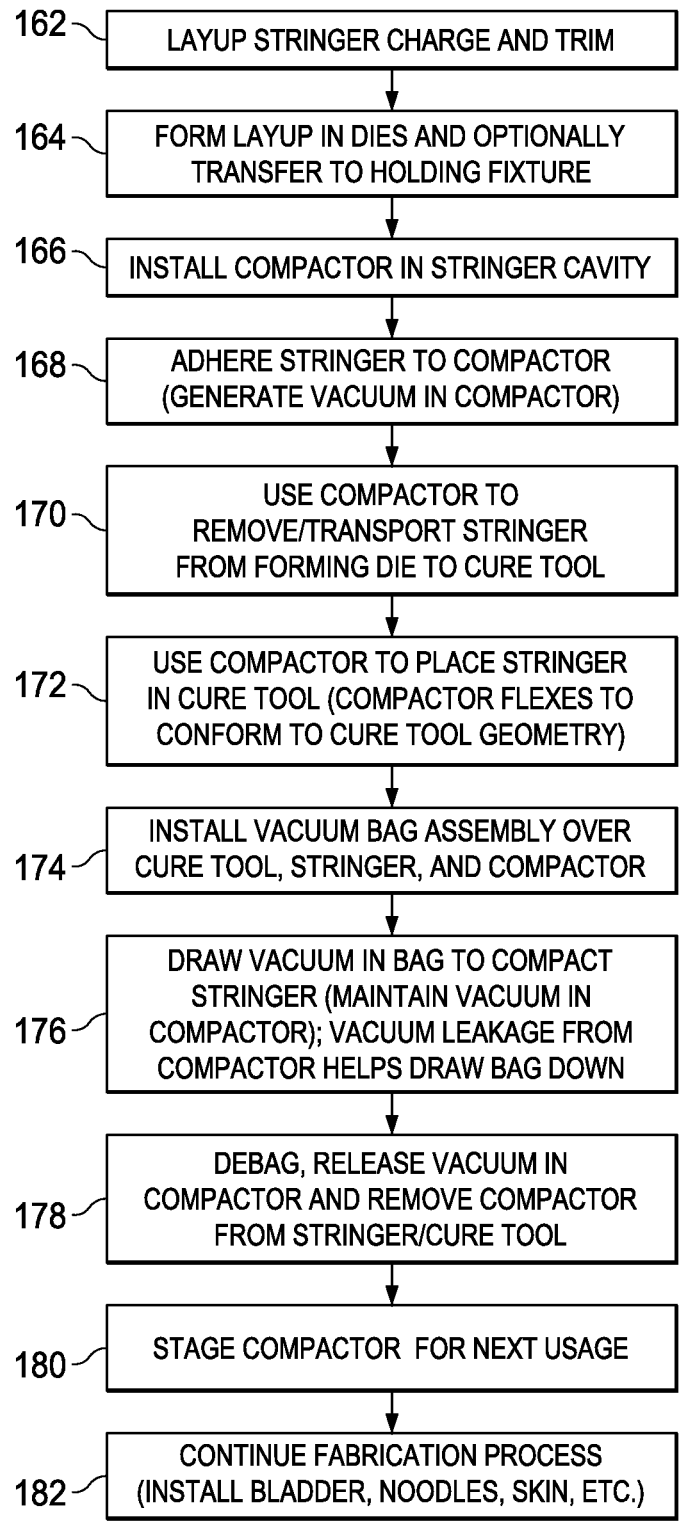
FIG. 27 is an illustration of a flow diagram of a method for fabricating a composite stringer.

FIG. 27 illustrates a flow diagram of the steps of fabricating the stringer 50 previously described in connection with FIGS. 20-25. Beginning at 162, the composite hat stringer 50 charge is laid up and, optionally trimmed, as necessary. At 164, the stringer charge is formed into a stringer shape, as by die stamping or other processes. The formed stringer 50 may be trimmed after it is formed in step 164, if not previously trimmed in step 162. Optionally, the stringer 50 may be transferred to a holding fixture until it is ready to be transported and placed by the compactor 30. At 166, the compactor 30 is installed in the stringer cavity 160. The compactor 30 may remain in the stringer 50 to maintain its shape until the stringer 50 is ready to be removed from the female die 156 or a holding fixture. At 168 the stringer 50 is adhered to the compactor 30 using a force generated by drawing a vacuum within the compactor 30 that sucks the stringer 50 against the compactor 30. Next, at 170, the compactor 30 is used to lift and transport the stringer 50 to a tool, fixture, part or other structure or surface. For example, and without limitation, the compactor 30 may be used to transport the stringer 50 to a tool 158, and then place the stringer 50 at a desired location on the tool 158 or other structure or surface. As the stringer 50 is being placed by the compactor 30, the compactor 30 may flex in either or both of two orthogonal planes 44, 46, or twist around its longitudinal axis 47 (FIG. 1) to the extent necessary to conform the stinger layup 50 to the curved surfaces of the structure, such as the tool surfaces 159.

At 174, a vacuum bag 155 along with other usual bagging components (not shown) are installed and sealed over the tool 158, covering the stringer 50 and the compactor 30. At 176, a vacuum is drawn on the bag 155 which compacts the stringer 50 through the compactor 50, while the vacuum is maintained within the compactor 30. The vacuum drawn within the compactor 30 may aid in evacuating the vacuum bag 155 during the compaction process, as a result of air leaking into the compactor 30 through the slits 40 (FIG. 1). At 178 the stringer layup is debagged, the vacuum within the compactor 30 is released, and the compactor 30 is removed from the tool 158. At 180, the compactor may be staged for reuse in compacting another stringer layup 50. The stringer fabrication process may be continued at 182, depending on the application, by installing fillers in the stringer 50, applying bladders, attaching skins to the stringer, etc.

Embodiments of the disclosure may find use in a variety of potential applications, particularly in the transportation industry, including for example, aerospace, marine, automotive applications and other application where automated layup equipment may be used. Thus, referring now to FIGS. 28 and 29, embodiments of the disclosure may be used in the context of an aircraft manufacturing and service method 184 as shown in FIG. 28 and an aircraft 186 as shown in FIG. 29. Aircraft applications of the disclosed embodiments may include, for example, without limitation, layup of stiffener members such as, without limitation spars and stringers. During pre-production, exemplary method 184 may include specification and design 188 of the aircraft 186 and material procurement 190. During production, component and subassembly manufacturing 192 and system integration 194 of the aircraft 186 takes place. Thereafter, the aircraft 186 may go through certification and delivery 196 in order to be placed in service 198. While in service by a customer, the aircraft 186 is scheduled for routine maintenance and service 200, which may also include modification, reconfiguration, refurbishment, and so on.

Each of the processes of method 184 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 29, the aircraft 186 produced by exemplary method 184 may include an airframe 202 with a plurality of systems 204 and an interior 206. The airframe 202 may include various stiffeners such as stringers and spars that may be fabricated using the disclosed method and compactor. Examples of high-level systems 204 include one or more of a propulsion system 208, an electrical system 210, a hydraulic system 212, and an environmental system 214. Any number of other systems may be included. Although an aerospace example is shown, the principles of the disclosure may be applied to other industries, such as the marine and automotive industries.

Systems and methods embodied herein may be employed during any one or more of the stages of the production and service method 184. For example, components or subassemblies corresponding to production process 192 may be fabricated or manufactured in a manner similar to components or subassemblies produced while the aircraft 186 is in service. Also, one or more apparatus embodiments, method embodiments, or a combination thereof may be utilized during the production stages 192 and 194, for example, by substantially expediting assembly of or reducing the cost of an aircraft 186. Similarly, one or more of apparatus embodiments, method embodiments, or a combination thereof may be utilized while the aircraft 186 is in service, for example and without limitation, to maintenance and service 200.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A compactor for use in fabricating a contoured elongate composite structure, comprising:
   a hat portion; and
   a cap portion coupled to the hat portion, the cap portion comprising:
      at least a first longitudinal section flexible along its length within a first plane; and
      at least a second longitudinal section coupled with the first longitudinal section and flexible along its length within the first plane and within a second plane, wherein the first and second planes are generally orthogonal to each other.

2. The compactor of claim 1, wherein the second longitudinal section of the cap portion is generally planar and the hat portion is adapted to be received within a cavity in the composite structure.

3. The compactor of claim 2, wherein the second longitudinal section includes:
   a plurality of reinforcement strips extending transversely across the width of the second longitudinal section and spaced apart along the length of the second longitudinal section,
   slots between the reinforcement strips, and
   a flexible material in the slots.

4. The compactor of claim 3, wherein:
   the hat portion includes a plurality of transversely extending slits therein, and
   the slits are substantially aligned with the slots in the second longitudinal section.

5. The compactor of claim 1, wherein the second longitudinal section includes a plurality of flexible rubber joints along its length allowing the second section to flex within the second plane.

6. The compactor of claim 1, wherein the second longitudinal section includes alternating strips of reinforcement and rubber along its length.

7. The compactor of claim 1, further comprising a splice joint between the first longitudinal section and the second longitudinal section.

8. The compactor of claim 3, wherein:
   the reinforcement strips include unidirectional fiber reinforced resin.

9. The compactor of claim 3, wherein:
   the flexible material includes a synthetic rubber.

10. The compactor of claim 3, wherein:
    the hat portion includes a plurality of slits therein along its length.

11. The compactor of claim 10, wherein:
    the slits extend substantially perpendicular to the plane of the cap portion.

12. The compactor of claim 11, wherein:
    the slits are substantially aligned with the slots between the reinforcement strips.

13. The compactor of claim 12, wherein:
    the hat portion has a generally open interior.

14. The compactor of claim 13, further comprising:
    a vacuum source, coupled to the hat portion, for drawing a vacuum within the open interior.

15. The compactor of claim 14, wherein:
    the plurality of slits are adapted to be coupled with the vacuum source to draw a composite layup against the hat portion.

16. The compactor of claim 1, wherein the hat portion further comprises:
    inclined side walls; and
    a bottom wall.

17. The compactor of claim 1, wherein the first longitudinal section and the second longitudinal section are coupled together by a joint.

18. The compactor of claim 17, wherein the joint is selected from a splice joint, a scarf joint, and a butt joint.

19. The compactor of claim 1, wherein at least one of the hat portion and the cap portion comprises laminated plies of fiber reinforced resin.

20. The compactor of claim 19, wherein the fiber reinforced resin is carbon fiber epoxy.

* * * * *